(12) United States Patent
Prakash et al.

(10) Patent No.: US 11,271,966 B2
(45) Date of Patent: *Mar. 8, 2022

(54) REAL-TIME DETECTION AND REDIRECTON FROM COUNTERFEIT WEBSITES

(71) Applicant: RedMarlin, Inc., Mountain View, CA (US)

(72) Inventors: Shashi Prakash, Mountain View, CA (US); Abhishek Dubey, Mountain View, CA (US)

(73) Assignee: Bolster, Inc, Los Altos, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/694,786

(22) Filed: Nov. 25, 2019

(65) Prior Publication Data

US 2020/0092326 A1 Mar. 19, 2020

Related U.S. Application Data

(63) Continuation-in-part of application No. 16/260,994, filed on Jan. 29, 2019.

(60) Provisional application No. 62/628,894, filed on Feb. 9, 2018.

(51) Int. Cl.
*H04L 29/06* (2006.01)
*G06F 16/955* (2019.01)

(52) U.S. Cl.
CPC ........ *H04L 63/1483* (2013.01); *G06F 16/955* (2019.01)

(58) Field of Classification Search
CPC ............. H04L 63/1416; H04L 63/1425; H04L 63/0245; H04L 67/02; H04L 63/1483; H04L 63/108; G06F 16/955; G06F 21/6263; G06F 21/44; G06F 21/554; G06F 21/51; G06F 21/552; G06F 21/606; G06F 2221/2119
See application file for complete search history.

(56) References Cited

U.S. PATENT DOCUMENTS

| | | | | |
|---|---|---|---|---|
| 10,104,113 | B1 * | 10/2018 | Stein | H04L 63/1433 |
| 10,212,130 | B1 * | 2/2019 | Yang | H04L 63/0236 |
| 10,616,274 | B1 * | 4/2020 | Chang | G06N 3/02 |
| 2008/0010683 | A1 * | 1/2008 | Baddour | G06F 16/951 |
| | | | | 726/24 |
| 2013/0312081 | A1 * | 11/2013 | Shim | H04L 63/1425 |
| | | | | 726/13 |

(Continued)

*Primary Examiner* — Harunur Rashid
(74) *Attorney, Agent, or Firm* — David R. Stevens; Stevens Law Group (57) ABSTRACT

Counterfeit uniform resource locators (URLs) are detected and blocked in real-time by a browser extension in communication with a counterfeit URL detection system. The browser extension receives a URL requested within a browser application. Content from a webpage associated with the received URL is extracted and transmitted to the counterfeit URL detection system, which is configured to analyze the content and return an assessment indicating whether the URL is counterfeit. If the assessment indicates that the URL is counterfeit, the browser extension blocks the browser application from accessing content associated with the URL and redirects the browser extension to a legitimate URL.

20 Claims, 7 Drawing Sheets

(56) References Cited

U.S. PATENT DOCUMENTS

| | | | |
|---|---|---|---|
| 2015/0007312 A1* | 1/2015 | Pidathala | H04L 63/145 726/22 |
| 2015/0373039 A1* | 12/2015 | Wang | H04L 63/1425 726/23 |
| 2017/0126723 A1* | 5/2017 | Wang | G06F 40/205 |
| 2018/0115584 A1* | 4/2018 | Alhumaisan | G06K 9/4652 |
| 2018/0289720 A1* | 10/2018 | Harrington | A61K 31/553 |
| 2018/0316712 A1* | 11/2018 | Birch | G06F 21/56 |

* cited by examiner

REAL-TIME DETECTION AND REDIRECTON FROM COUNTERFEIT WEBSITES

CROSS-REFERENCE TO RELATED APPLICATION

This disclosure is a continuation in-part application that claims the benefit of U.S. patent application Ser. No. 16/260,994, filed Jan. 29, 2019, which claims the benefit of U.S. Provisional Patent Application No. 62/628,894, filed Feb. 9, 2018, which is incorporated herein by reference in its entirety.

TECHNICAL FIELD

This disclosure relates to detecting and blocking access to counterfeit websites in real time.

BACKGROUND

Counterfeit websites are used for a variety of nefarious purposes. These websites are created with intent to make users believe they are using a legitimate site of a known entity, deceiving the users into providing sensitive personal or financial information or downloading potentially dangerous files. In some cases, links to counterfeit websites may be sent to the user in a message, such as an email, SMS message, or instant message. In other circumstances, a nefarious website may have an address similar to that of a popular, trusted website, such that a user is directed to the nefarious website if a user mistypes the address of the popular website into a browser. Because the harm that these counterfeit websites or their operators can cause to a user may be severe, it is desirable to block access to these websites.

DETAILED DESCRIPTION

System Overview

Counterfeit uniform resource locators (URLs) are detected and blocked in real-time by a browser extension in communication with a counterfeit URL detection system. The browser extension, configured for example as an extension within a web browser, email client, or mobile application, protects users against nefarious websites by intercepting a request to access a counterfeit URL and blocking the web browser, email client, or mobile application from accessing the nefarious content. In some embodiments, the browser extension receives a URL requested within a browser application. Content from a webpage associated with the received URL is extracted and transmitted to the counterfeit URL detection system, which is configured to analyze the content and return an assessment indicating whether the URL is counterfeit. If the assessment indicates that the URL is counterfeit, the browser extension blocks the browser application from accessing content associated with the URL.

As used herein, a "counterfeit URL" refers to an address that references an untrusted webpage. These webpages may exhibit nefarious behaviors, such as phishing for sensitive information from a user or causing malicious content to be downloaded to a user's device, or may emulate other websites in order to deceive users into believing that the webpage is affiliated with a trusted source. Some counterfeit URLs may mimic the URL of a well-known website so that the user believes she is accessing the well-known website. For example, if a user is familiar with www.example.com, the user may believe she is accessing the familiar webpage when in reality she is requesting the counterfeit URL www.example.com. Other counterfeit URLs may redirect the browser to nefarious webpages, such that a user's careful inspection of the requested URL may not reveal information about the webpage ultimately displayed by the browser.

Figure 1:
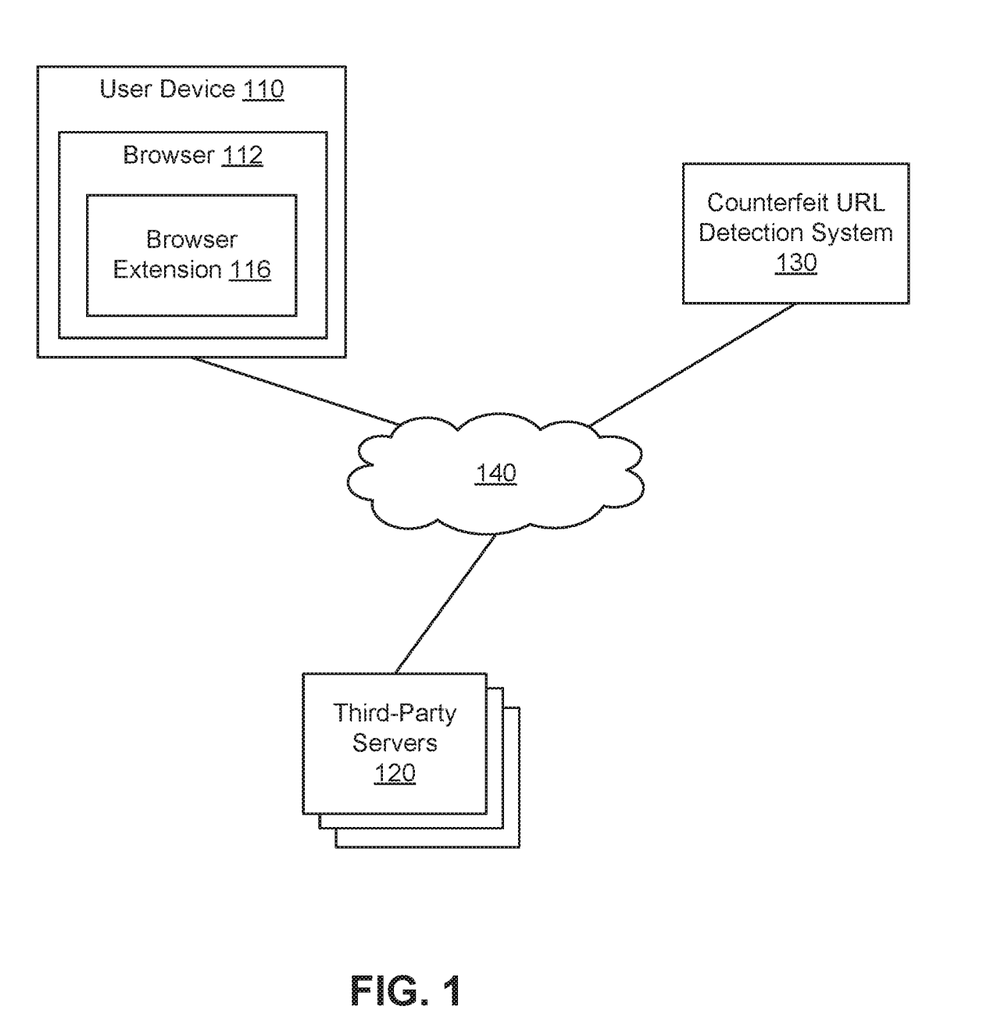
FIG. 1 is a block diagram illustrating an environment in which counterfeit website detection is performed, according to one embodiment.

FIG. 1 is a block diagram illustrating an environment in which counterfeit website detection is performed, according to one embodiment. As shown in FIG. 1, the environment can include a user device 110, one or more third-party servers 120, and a counterfeit URL detection system 130 communicating over a network 140. The network 140 enables communication between the user device 110, third party servers 120, and counterfeit URL detection system 130, and may include one or more local area networks (LANs), wide-area networks (WANs), metropolitan area networks (MANs), and/or the Internet.

The user device 110 is a computing device used by a user to access content over the network 140 and can be any device capable of displaying electronic content and communicating over the network 140, such as a desktop computer, laptop or notebook computer, mobile phone, tablet, eReader, television set, or set top box. In some cases, the user device 110 can be configured as part of an enterprise, representing a plurality of user devices 110 associated with an organization such as a company.

The user device 110 executes a browser application 112, comprising software that when executed by the user device 110 retrieves and displays electronic documents. Other applications can additionally be executed by the user device 110, such as an email application, a short messaging service (SMS) application, or other applications capable of receiving and sending electronic messages.

As used herein, the browser application 112 can refer to any application capable of retrieving electronic content over the network 140, including web browsers, mobile applications, or email applications. The browser application 112 includes a user interface enabling users to interact with electronic content by, for example, displaying the content to the user, providing a navigation or address bar for users to input URLs to request desired content, and rendering selectable hyperlinks embedded within content that can be selected to cause the browser application 112 to retrieve additional content. The browser application 112 may also include a networking engine that retrieves content associated with a URL when the URL is requested by explicit user action or by a call from an external application. For example, a user may explicitly request the browser application 112 access a URL by typing or pasting a copied URL into an address bar in the browser user interface. As another example, if a user selects a hyperlink in an email that contains a URL, the email application may generate a call to the browser application 112 to cause the browser 112 to access a webpage identified by the URL.

A browser extension 116 operates within or parallel to the browser application 112 and extends functionality of the browser application 112. The browser extension 116, which for example can comprise computer program instructions provided by the counterfeit URL detection system 130 and executable by a processor of the user device 110, can receive a URL requested by the browser application 112. Before the browser application 112 retrieves and displays content associated with the webpage identified by the URL, the browser extension 116 determines whether the URL is counterfeit. If the URL is determined to be counterfeit, the extension 116 blocks the browser application 112 from displaying the webpage content. If the page is determined to not be counterfeit, the extension 116 allows the browser application 112 to display the content (for example, by taking no action to block the content). The browser extension 116 is described further with respect to FIG. 2.

The third-party servers 120 store electronic content and serve the content to the user device 110 when requested. The third-party servers 120 can be computing devices associated with any of a variety of sources of content that may be requested by a user, such as banks, online retailers, or government entities. Some of the third-party servers 120 may be associated with a malicious actor and serve counterfeit websites that are designed to look like or deceive users into believing they are associated with a trusted content source.

The counterfeit URL detection system 130 analyzes URLs and webpage content to determine whether a webpage provided by a third-party server 120 is authentic or counterfeit. In some cases, the detection system 130 is configured as part of an enterprise shared with a plurality of user devices 110, for example communicating with the user devices 110 over a local area network or behind a firewall shared with the user devices 110. In other cases, the detection system 130 is remote and operated independently from the user device 110, for example on one or more cloud-based servers. The detection system 130 can instead be operated by the user device 110, as an application external to the browser 112. The detection system 130 may also provide the browser extension 116 for download by the user device 110.

In general, the counterfeit URL detection system 130 applies a trained model to content extracted from or associated with a webpage. When applied to a set of data associated with a URL, the model outputs a score indicating a likelihood that the URL is counterfeit. The detection system 130 uses the score to generate an assessment indicating either that the URL is counterfeit or not counterfeit, and returns the assessment to the browser extension 116. The counterfeit URL detection system 130 is described further with respect to FIG. 3.

Figure 2:
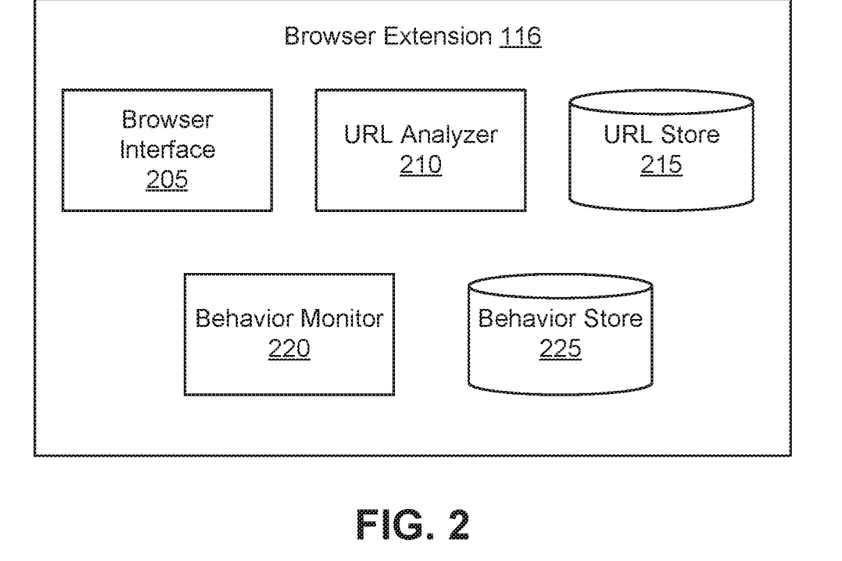
FIG. 2 is a block diagram illustrating functional modules within a browser extension, according to one embodiment.

FIG. 2 is a block diagram illustrating functional modules within the browser extension 116, according to one embodiment. As shown in FIG. 2, the browser extension 116 can include a browser interface 205, a URL analyzer 210, a URL store 215, a behavior monitor 220, and a behavior store 225. Each of the modules can comprise computer program instructions executable by a processor, such as a processor of the user device 110. The browser extension 116 can include additional, fewer, or different modules, and functionality can be distributed differently between the modules.

The browser interface 205 communicates with the browser 112 to receive URLs requested in the browser 112 and block the browser 112 from accessing URLs that are determined to be counterfeit.

The URL analyzer 210 determines whether URLs requested by the browser 112 are counterfeit or authentic. To determine whether a URL is counterfeit, the URL analyzer 210 can access a URL store 215 that stores a list of URLs known to be either trusted or counterfeit. The URL store 215 can comprise a database or listing of URLs, each mapped to an assessment of whether the URL is trusted or counterfeit. The URL store 215 can be stored locally on the user device 110 or on another device accessible to the URL analyzer 210. If the received URL is listed in the URL store 215, the URL analyzer 210 can determine whether the received URL is trusted based on the assessment of the URL in the store 215.

In some cases, a URL that is similar but not identical to a requested URL is stored in the URL store 215, and the URL analyzer 210 matches the requested URL to a similar stored URL based on a heuristic. In one embodiment, the URL analyzer 210 matches the requested URL to the URL in the store 215 if at least a portion of the requested and stored URLs match. A matched portion of the URLs may include at least a domain name. For example, if the requested URL is www.example.com/sub-level, and the URL store 215 identifies the domain www.example.com as a counterfeit URL, the URL analyzer may determine that the requested URL is also counterfeit because it includes at least the counterfeit domain name. In another embodiment, the heuristic applied by the URL analyzer 210 accounts for patterns in counterfeit and authentic URLs listed in the URL store 215. For example, if www.example.com is assessed in the URL store 215 as being authentic but subdomain1.example.com and subdomain2.example.com are assessed as counterfeit, the URL analyzer 210 may determine that subdomain3.example.com is also likely to be counterfeit because it is more similar to the URLs known to be counterfeit than to the authentic URL.

The URL analyzer 210 can also extract information associated with a received URL to analyze whether the URL is counterfeit. In some embodiments, the URL analyzer 210 extracts the information associated with the URL if the URL is not listed in the URL store 215. In other embodiments, the URL analyzer 210 may extract the information for some or all webpages requested by the browser 112, even if an assessment of the URL is listed in the URL store 215. The extracted information can include content of a webpage referenced by the URL. For example, the URL analyzer 210 can retrieve text from the webpage or any images on the page. The URL analyzer 210 may additionally or alternatively extract information from HTTP requests transmitted by the browser 112 and HTTP responses received by the browser. For example, a header and a body can be extracted from both the HTTP request and response. Any information extracted by the URL analyzer 210 is sent to the counterfeit URL detection system 130 for analysis. When an analysis is returned by the detection system 130, the URL analyzer 210 can add the URL and assessment to the URL store 215 and either block or allow access to the webpage based on the assessment.

The behavior monitor 220 captures user behaviors related to the browser 112 and counterfeit websites, and stores the user behaviors in the behavior store 225. The user behaviors can include a number of unique URLs requested by the user of the user device 110 in a specified period of time. In some cases, the behavior monitor 220 can record any URL requested by the browser 112, whether directly entered into the browser 112 by the user or triggered by a user selection of a hyperlink in a webpage or external application such as an email or SMS messaging application. In other cases, the behavior monitor 220 may record only a number of URLs that were requested in response to specified actions. For example, the behavior monitor 220 can record a number of URLs requested in response to a user selection of a hyperlink in an external application, but does not record a number of URLs requested in response to a user directly entering the URL into the browser 112.

The user behaviors recorded by the behavior monitor 220 can also include a number of counterfeit webpages blocked, which can be quantified, for example, as a number of webpages blocked in a specified period of time (e.g., three counterfeit URLs blocked in eight hours) or as a rate relative to the number of unique URLs requested (e.g., one counterfeit URL blocked per 100 requested URLs). For each blocked webpage, the browser extension 116 can record the URL of the page and information about the source of the URL. For example, a URL source can indicate whether the user received the URL in an email, in an SMS message, or through another webpage. If received in a message, the behavior monitor 220 can also record information about the sender of the message, such as an email address or phone number of the sender. If received through another webpage, the behavior monitor 220 can record a URL or other identifier of the webpage.

Additional user behaviors recorded by the behavior monitor 220 can include user details associated with the user of the user device 110. These details can include, for example, an identifier of the user (such as a username) or of the user device 110 (such as an IP address or MAC address), or a user-agent string.

Figure 3:
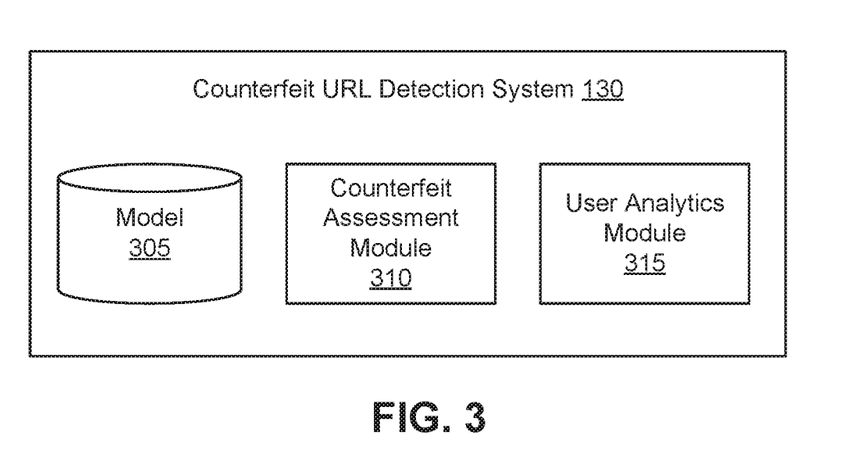
FIG. 3 is a block diagram illustrating functional modules within a counterfeit URL detection system, according to one embodiment.

FIG. 3 is a block diagram illustrating functional modules within the counterfeit URL detection system 130, according to one embodiment. As shown in FIG. 3, the detection system 130 can include a model 305, a counterfeit assessment module 310, and a user analytics module 315. Each of the modules can comprise computer program instructions executable by a processor. Furthermore, the counterfeit URL detection system 130 can include additional, fewer, or different modules, and functionality can be distributed differently between the modules. For example, the user analytics module 315 may be executed by the user device 110 or a device affiliated with an enterprise including the device 110, rather than the counterfeit URL detection system 130.

The model 305 is a trained object representing mathematical relationships between features related to a URL and a likelihood that the URL is counterfeit. The model 305 can be trained using components of webpages that are known to be counterfeit or not counterfeit. These webpage components, including, for example, one or more of text extracted from a webpage, an image extracted from the webpage, HTTP request and response headers or bodies, or the URL itself, may be grouped into a set of data representing each URL and labeled with an assessment of the webpage's authenticity. Any of a variety of machine learning or statistical techniques can be applied to the labeled webpage components to generate the model 305. In some cases, different algorithms can be applied to different types of webpage components. For example, images extracted from the webpage can be analyzed by image object detection and image recognition algorithms. Text can be analyzed by a natural language processing algorithm. Threat intelligence, either learned or received from an external provider, can supplement these techniques.

The model 305 may be updated periodically, such as once per month or once per year, using new sets of webpage components. For example, the model is updated periodically in order to respond to new techniques used by nefarious actors.

The counterfeit assessment module 310 applies the model 305 to a dataset associated with a URL to determine whether a URL is counterfeit. The dataset, which can be transmitted to the counterfeit assessment module 310 by the browser extension 116, may include components of a webpage referenced by the URL, HTTP requests and responses associated with an attempt by the browser to display the webpage, and/or the URL itself. The counterfeit assessment module 310 applies the model 305 to the dataset and receives a score output by the model 305. Based on the score, the counterfeit assessment module 310 determines whether the URL is counterfeit.

In one embodiment, the counterfeit assessment module 310 determines whether the URL is counterfeit by comparing the score to a threshold. If the score is greater than the threshold, the counterfeit assessment module 310 outputs an assessment that the URL is counterfeit. If the score is less than the threshold, the module 310 outputs an assessment that the URL is not counterfeit.

In another embodiment, the counterfeit assessment module 310 analyzes the score based on a threat tolerance specified by the user of the user device 110, an administrator of an enterprise associated with the user device 110, or another user. If an enterprise has a low threat tolerance (because, for example, the enterprise deals in highly sensitive data), the counterfeit assessment module 310 sets a high threshold score. A lower threshold score can be set for an enterprise that has a high threat tolerance (e.g., because overly cautious URL analysis and blocking would interrupt the workflow of the enterprise). For example, if the model 305 outputs scores from 0 to 1, where a score of 1 indicates certainty that a URL is counterfeit, the counterfeit assessment module 310 may set a threshold of 0.75 when an enterprise or user has a low threat tolerance and a threshold of 0.5 when an enterprise or user has a high threat tolerance.

The user analytics module 315 receives data describing behaviors of users that are associated with URLs and webpages, for example as captured by the behavior monitor 220, and generates analytics that quantify the user behaviors for one or more users. As described above, the user behaviors can include, for example, a number of unique URLs requested by users, a number of counterfeit webpages blocked by the browser extension 116, and sources of the counterfeit URLs. The user analytics module 315 analyzes the behaviors for one or more users over a period of time and outputs a representation of the analyzed behaviors for review by a user, such as the user of the device 110 or an administrator of an enterprise.

In one embodiment, the representation output by the user analytics module 315 includes a list of any users in an enterprise that attempted to access more than a specified number of counterfeit URLs in a specified period of time.

For example, the user analytics module 315 identifies, based on the received user behavior data, any user in an enterprise who attempted to use at least five counterfeit URLs in a particular month. As another example, the user analytics module 315 identifies any user in the enterprise for whom counterfeit URLs constituted at least 1% of the total number of URLs accessed by the user in a specified quarter. The users identified by the analytics module 315 can be output to an administrator of the enterprise to, for example, build a list of users to whom to target training efforts.

In another embodiment, the representation output by the user analytics module 315 identifies common sources of counterfeit URLs. The sources identified by the analytics module 315 may be a general category of sources through which one or more users have received a greatest number of counterfeit URLs. For example, the analytics module 315 may determine that 63% of all counterfeit URLs accessed by users in an enterprise during a specified year were contained in an email, while lower percentages of the counterfeit URLs were accessed through SMS messages, webpages, or other sources. Alternatively, the sources identified by the analytics module 315 may include particular originating sources who have provided the highest number of counterfeit URLs accessed by one or more users, or who have provided greater than a threshold number of the counterfeit URLs accessed by the users. These particularized sources may identify, for example, a domain name or IP address that transmits emails containing counterfeit URLs, a telephone number that transmits SMS messages containing counterfeit URLs, or a name or other identifier of a user who has sent messages containing counterfeit URLs. For example, the analytics module 315 may determine that, of the counterfeit URLs accessed by a particular user, a greatest number of them were provided through emails sent from the domain @example.com.

Once a common source of counterfeit URLs has been identified, the user analytics module 315 may generate recommendations for reducing user attempts to access counterfeit URLs. In some cases, the analytics module 315 combines the source analytics with analytics identifying the users in an enterprise who were most likely to access a counterfeit URL, providing the enterprise with recommendations for targeted training. For example, if the users in an enterprise who accessed the most counterfeit URLs in a month received most of those counterfeit URLs through SMS messages, the analytics module 315 may recommend that the enterprise train users to identify trusted or untrusted SMS messages. In other cases, the analytics module 315 may recommend particular updates to a security policy, a firewall, or an email spam filter to block messages originating from a source that has provided a significant quantity of counterfeit URLs.

Real-Time Blocking of Counterfeit Websites

Figure 4:
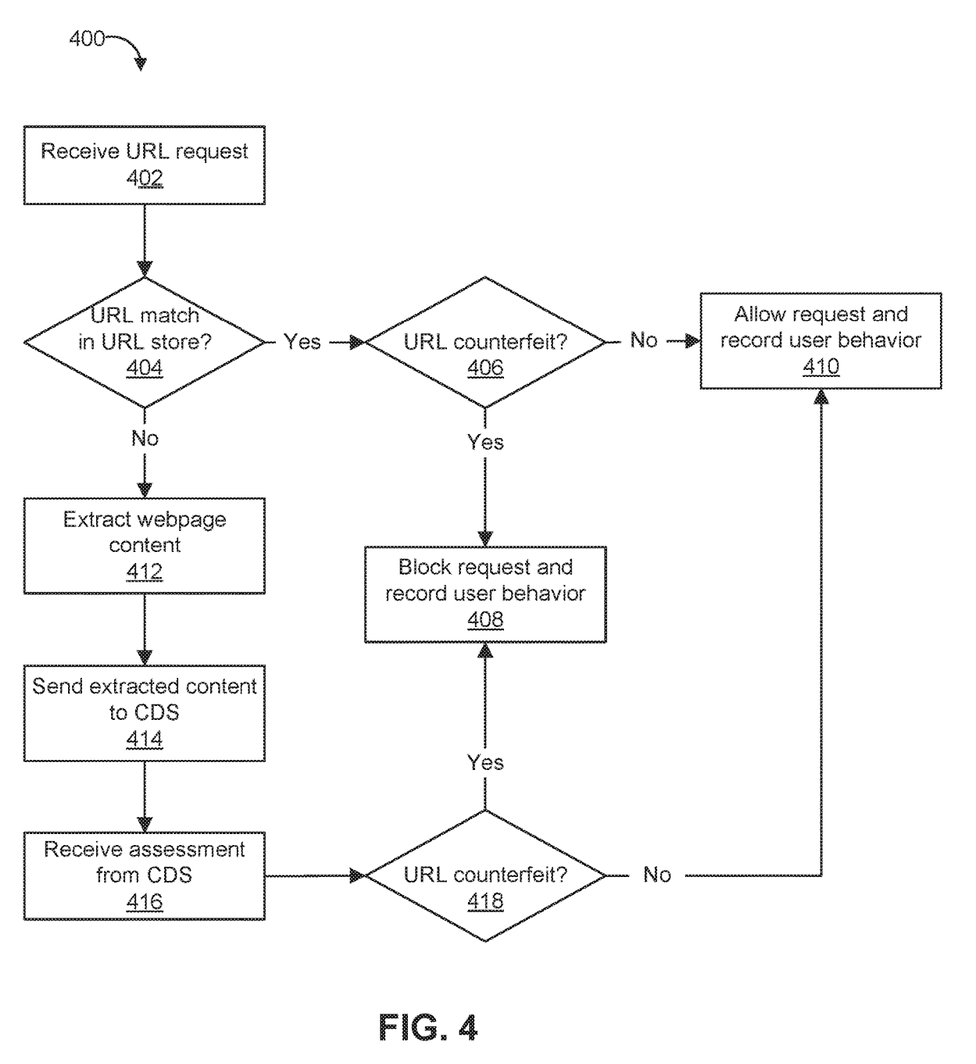
FIG. 4 is a flowchart illustrating a process for blocking user access to counterfeit websites in real-time, according to one embodiment.

FIG. 4 is a flowchart illustrating a process 400 for blocking user access to counterfeit websites in real-time, according to one embodiment. The process 400 can be performed by the user device 110, for example by executing the browser extension 116. The steps of the process 400 can include additional, fewer, or different steps, and the steps can be performed in different orders.

As shown in FIG. 4, the browser extension 116 receives 402 a URL from the browser 112. The browser extension 116 can capture the URL from the browser application 112 when the URL is requested in the browser. In some cases, an external application calls the browser 112 to access a URL when a user selects a hyperlink containing the URL in the external application. For example, if the user selects a link in an email, the email application generates a call to the browser application 112 that contains the URL and causes the browser 112 to access a webpage associated with the URL.

The browser extension 116 determines 404 whether the received URL has a match in a URL store 215. The URL store 215 stores assessments of authenticity of each of a plurality of known URLs. The browser extension 116 may determine 404 if the received URL matches any known URL in the store 215 by searching either for a direct match to the received URL, or by comparing the received URL to the known URLs using heuristics.

If the received URL is matched to a known URL in the store 215, the browser extension 116 determines 406 if the received URL is counterfeit based on the assessment stored for the matched URL. For example, if the URL store 215 indicates that the matched URL is counterfeit, the browser extension 116 determines that the received URL is also counterfeit.

If the received URL is determined 406 to be counterfeit, the browser application 116 blocks 408 access to webpage content referenced by the received URL. For example, the browser application 116 transmits an instruction to the browser application 112 to not request the webpage content, to not display the webpage content, or to stop displaying the webpage content. In some cases, the browser application 116 redirects the browser 112 away from the webpage associated with the URL, causing the browser to, for example, display a page indicating that the webpage has been blocked. The browser application 112 can also capture and record any user behaviors related to the attempt to access the URL.

If the received URL is determined 406 to not be counterfeit, the browser application 116 allows 410 access to content associated with the URL. For example, the browser application 116 takes no action to interrupt the process in the browser 112 to request and display the webpage content referenced by the URL. User behaviors associated with the URL can also be captured and stored in the behavior store 225.

Returning to step 404, if the received URL does not match any known URLs in the URL store 215, the browser application 116 extracts 412 content from a webpage referenced by the received URL. The extracted content is sent 414 to the counterfeit URL detection system 130 for analysis, and the browser extension 116 receives 416 an assessment of the URL from the detection system 130. The assessment indicates whether the received URL is counterfeit. If the assessment indicates that the URL is counterfeit 418, the browser application 116 blocks 408 access to the webpage and records user behavior. If the assessment indicates that the URL is not counterfeit, the browser application 116 allows 410 the request and records the user behavior.

Figure 5:
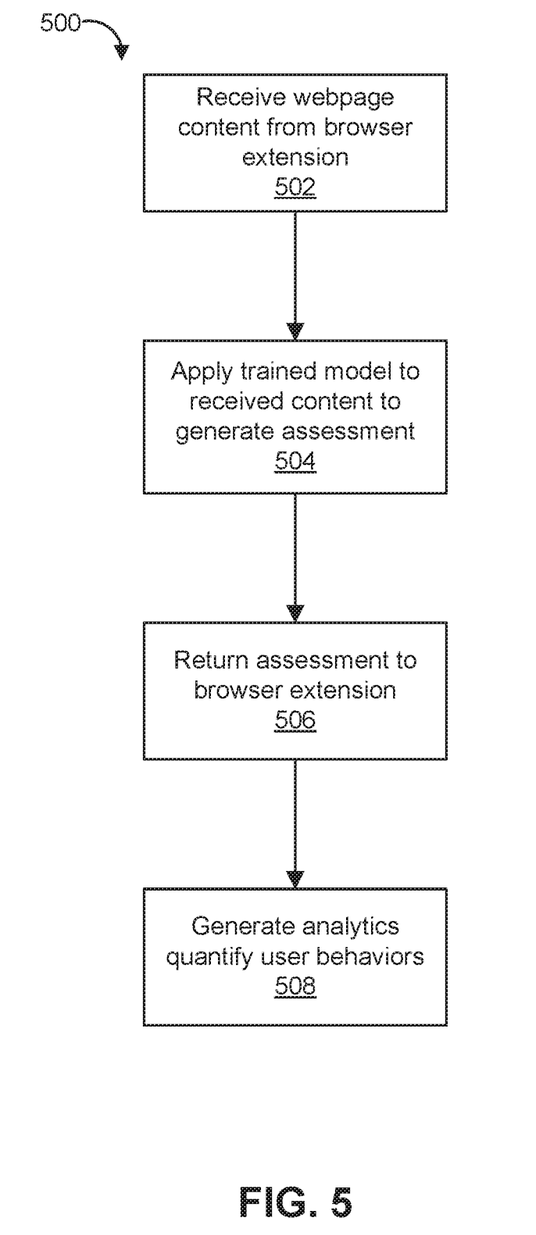
FIG. 5 is a flowchart illustrating a process for analyzing whether URLs are counterfeit, according to one embodiment.

FIG. 5 is a flowchart illustrating a process 500 for analyzing whether URLs are counterfeit, according to one embodiment. The process 500 can be performed by the counterfeit URL detection system 130. The steps of the process 500 can include additional, fewer, or different steps, and the steps can be performed in different orders.

As shown in FIG. 5, the detection system 130 receives 502 webpage content from a browser extension 116 executed by a user device 110. The received content can include content extracted from a webpage referenced by a URL requested by a user of the user device. User behaviors collected by the browser extension 116 can also be transmitted to the detection system 130, either in conjunction with the webpage content or asynchronously.

The detection system 130 applies 504 a trained model to the received content. The model is configured to output an assessment indicating whether a URL is counterfeit based on analysis of webpage content associated with the URL. When the model is applied to the received webpage content, the detection system 130 receives an indication that the URL requested on the user device 110 is counterfeit is or is not counterfeit.

The detection system 130 returns 506 the assessment to the browser extension 116, which is configured to block access to the webpage if the assessment indicates that the URL is counterfeit.

The detection system 130 also generates 508 analytics that quantify user behaviors related to URLs. The analytics can include, for example, an identification of users who accessed at least a threshold number of counterfeit URLs in a specified period of time, or an identification of a source that provided at least a threshold number of counterfeit URLs. The analytics can be output for display to an administrator of the detection system 130 or provided as feedback to a user or enterprise, for example to customize training programs or to modify enterprise security policies.

Redirecting a Counterfeit URL

Figure 6:
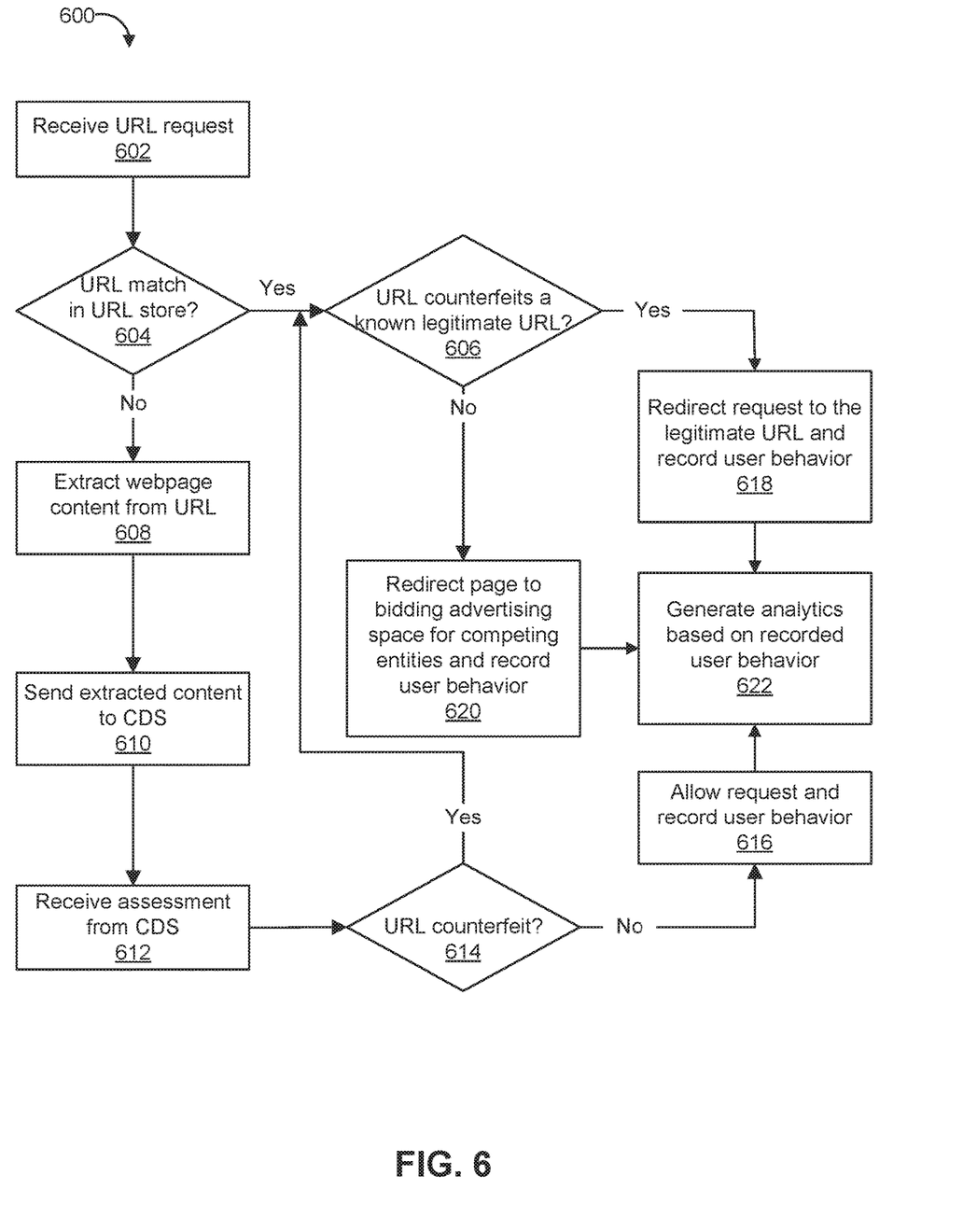
FIG. 6 is a flowchart illustrating a process for analyzing whether URLs are counterfeit and redirecting a browser application to a legitimate URL, according to one embodiment.

FIG. 6 is a flowchart illustrating a process 600 for analyzing whether URLs are counterfeit and redirecting a browser application to a legitimate URL, according to one embodiment. As noted above, a received URL may be inspected to determine whether the received URL is counterfeit. If the received URL is determined to be counterfeit, a browser extension executing on a user device may be redirected to a legitimate URL associated with a legitimate entity. A legitimate entity may include an entity (e.g., a company, institute, university) that is legitimately operating a webpage and providing a service to users (e.g., retailing a product, providing information). In some embodiments, the legitimate entity may include entities that are explicitly authorized and subscribed as being legitimate entities and may receive redirected URL requests from a browser application executing on a user device. In some embodiments, the browser application can execute on a mobile device (e.g., a smartphone) that may communicate using one or more communication channels (e.g., the internet, wi-fi).

Redirecting a received URL to a legitimate URL may include determining whether the content of the received URL counterfeits a known legitimate URL. In some embodiments, redirecting a received URL to a legitimate URL may include comparing content extracted from a webpage associated with the received URL to content extracted from a webpage associated with the legitimate URL. In other words, the characteristics of the content extracted from the received URL (e.g., text, objects detected in images, domain name, a hypertext transfer protocol (HTTP) request header or body, an HTTP response header or body) may be compared with the characteristics of the content extracted from the legitimate URL to determine whether the characteristics have a similarity that exceeds a threshold similarity. A threshold similarity may include an identified number of similar characteristics between the received URL and the legitimate URL that indicates that the received URL has likely attempted to counterfeit or mimic the legitimate URL.

As an example, the characteristics of the website associated with the received URL may include a plurality of shoes offered for sale in a specific format on the webpage and a logo with distinctive features. The characteristics of a website associated with a known legitimate URL of a leading shoe retailer may include similar layout of the plurality of shoes offered for sale in the specific format shown in the webpage of the received URL and a similar logo with many of the same distinctive features as in the webpage of the received URL. In this example, the received URL may be attempting to take advantage of the fame and web browser traffic to the known legitimate URL. Based on identifying the similarity between the received URL and legitimate URL, the browser of a user device may be redirected to the legitimate URL.

The browser application executing on a user device may receive a URL request (block 602). The URL request may include a request for a specific URL.

The browser application may inspect the URL request to determine whether the requested URL matches any URL listed in a URL store (block 604). When a user clicks on a Uniform Resource Locator (URL) link, the URL may be matched against a datastore of URLs using heuristics. The received URL can be compared against a listing of known counterfeit URLs to determine whether the URL matches a known counterfeit URL. In some embodiments, the URL store may include a listing, database, registry, etc., of known or trusted URLs associated with legitimate entities. If the URL matches a URL in the URL store, the received URL may be a counterfeit URL and browser application may determine whether the URL counterfeits a known legitimate URL (block 606).

If the URL fails to match a URL in the URL store, the browser application may extract webpage content from the URL (block 608). Extracting webpage content may include identifying images, text, HTTP headers, etc., associated with the received URL. A set of characteristics (e.g., detected objects, detected text, features of images, format of the webpage, domain name) may be identified from the extracted text of the received URL.

The browser application may send the extracted content to a counterfeit URL detection system (CDS) (block 610). The CDS may include an engine that utilizes a Graphical Processing Unit (GPU) in combination with various techniques (image object detection, natural language processing, threat intelligence, etc.) to determine whether the website is counterfeit.

The browser application may receive an assessment from the CDS (block 612). The assessment may include a verdict on whether the website is counterfeit. The counterfeit URL detection system may determine whether the URL is counterfeit based on the received assessment (block 614). If the URL is not counterfeit (i.e. the webpage is legitimate), the browser application may allow the request, load the requested URL, and record user behavior (block 616).

If the assessment indicates that the URL is counterfeit, the browser application may determine whether the URL counterfeits a known legitimate URL (block 606). This may include extracting content (e.g., text, images, video, logos, domain names) from the counterfeit URL to identify characteristics of the extracted content. Various techniques, such as object detection, image recognition, natural language processing, etc., may be utilized to identify characteristics included in the extracted content from the counterfeit URL. In some embodiments, the browser application may utilize a central artificial intelligence engine that is implemented on any of a user device or a cloud-based device or series of interconnected devices.

The characteristics identified from the extracted content of the counterfeit website may be compared to a plurality of legitimate webpages. In some embodiments, content of various legitimate webpages may be extracted to determine characteristics of each legitimate webpage. For example, a web indexing process (e.g., a web crawler) may retrieve content from various legitimate URLs over a network (e.g., the internet). Extracting content from any of the counterfeit URL and a legitimate URL may include fetching images, text, HTTP requests from the URL and analyzing the extracted content at any of a user device or a cloud-based device. The extracted content and identified characteristics associated with each of the plurality of legitimate websites may be maintained in any of a browser extension and the counterfeit URL detection system.

In some embodiments, a plurality of known legitimate websites may be listed on a primary listing of legitimate webpage. The primary listing of legitimate websites may include websites/URLs associated with legitimate entities that are authorized as legitimate and have subscribed to have received counterfeit URLs redirected to the legitimate URL. In some embodiments, the primary listing of known legitimate websites may include known legitimate URLs. The primary listing may include a listing, registry, database, etc. that includes a plurality of legitimate URLs associated with a legitimate entity and characteristics of the content provided on each webpage. In some embodiments, a portion of the plurality of legitimate URLs are included in a primary listing of legitimate URLs that represent legitimate entities subscribed to receive redirected browser extensions.

Determining whether a counterfeit URL is counterfeiting a legitimate URL may include comparing the identified characteristics of the counterfeit URL and the identified characteristics of the legitimate URL. For example, the counterfeit URL may include an image of a logo that is substantially similar to a logo associated with a legitimate entity and shown on a legitimate webpage. As another example, the counterfeit URL may include listing of items (e.g., shoes for sale) displayed on the webpage. The counterfeit webpage displaying listing of items may be similar to a listing of items listed on a legitimate webpage, indicative that the counterfeit webpage is attempting to counterfeit the legitimate webpage.

In some embodiments, a first set of characteristics of the extracted content of a webpage associated with the received URL may be identified. The first set of characteristics may include at least one of detected objects, detected text, and detected source information included in the extracted content of the webpage associated with the received URL. The first set of characteristics of the received URL may be compared to a plurality of characteristics associated with the first legitimate URL to determine whether a number of common characteristics between the first set of characteristics and the plurality of characteristics exceeds a threshold number, indicative that the first legitimate URL is within the threshold similarity to the received URL. A threshold similarity may include a specific or predetermined number of common characteristics between the received URL and a legitimate URL that indicate that the received URL has attempted to counterfeit the legitimate URL.

Upon identifying a known legitimate URL that the counterfeit URL is attempting to counterfeit; the browser application may redirect the request to the legitimate URL and record user behavior (block 618). In some embodiments, the browser application may identify a legitimate webpage with content that is within a threshold similarity to the content of a counterfeit webpage, and the user may be redirected to the legitimate webpage. In some embodiments, the user may be redirected to a legitimate webpage listed on the primary listing of legitimate webpages.

If the browser application determines that counterfeit URL is not counterfeiting a known legitimate URL, the user may be redirected to a legitimate URL included on a bidding space for competing entities (block 620). For example, the browser application may be unable to match the content of a counterfeit URL with a known legitimate entity with a threshold similarity. In this example, a second set of legitimate entities included part of the competing entities may bid for or present offers to have the user redirected to their URL.

In some embodiments, the user may be redirected to a legitimate URL included in the competing space based on the extracted content of the counterfeit URL and the bidding information associated with the legitimate URL. For example, the counterfeit URL may include content relating to marketing shoes. In this example, various legitimate entities included in a competing space that operate webpages marketing shoes may present bids to have the user browser redirected to the URL of a legitimate entity. The browser application may identify a primary objective of the counterfeit URL (e.g., marking a specific style of shoe) and identify potential legitimate entities to have the user redirect to a legitimate entity URL that presented the greatest bid. In this example, the legitimate entity in the competing space that includes the greatest bid value may have the browser application of the user device redirected to the URL of the legitimate entity.

In some embodiments, the listing of known legitimate URLs can be listed on a primary listing of legitimate URLs. If the counterfeit URL is not counterfeiting any legitimate URL, the browser application can inspect a secondary listing of legitimate URLs to determine if the content of any legitimate URL listed in the secondary listing of legitimate URLs matches the counterfeit URL with a threshold similarity. The secondary listing of legitimate URLs may include legitimate entities that are authorized but have not subscribed as a known legitimate URL. In some embodiments, the legitimate URLs listed on the secondary listing of legitimate URLs include URLs included in the competing space that may bid for or provide an offer to have the browser application of a user redirected to a legitimate URL.

In some embodiments, it may be determined that all legitimate URLs included in a portion of the plurality of legitimate URLs listed in a primary listing of legitimate URLs do not exceed the threshold similarity to the extracted content of the received URL. In response, the content of the received URL may be compared with content associated with a portion of the plurality of legitimate URLs listed in a secondary listing of legitimate URLs representing legitimate entities offering a bid to receive redirected browser extensions. A first legitimate URL listed in the secondary listing of legitimate URLs may be identified that includes content that is similar to the content of the received URL that exceeds a threshold similarity. The received URL may be directed to the first legitimate URL based on any of the content of the first legitimate URL being similar to the received URL exceeding a threshold similarity and a bid/offer associated with the first legitimate URL exceeding any other bid/offer associated with other legitimate URLs listed in the secondary listing of legitimate URLs.

In some embodiments, a primary characteristic of the extracted content of the received URL may be identified. Each legitimate URL included in the secondary listing of legitimate URLs that include characteristics matching the primary characteristic may also be identified. redirecting the browser extension to the first legitimate URL may be based on determining that the bid associated with the first legitimate URL is greater than any bids of the other legitimate URLs included in the secondary listing of legitimate URLs that include characteristics matching the primary characteristic. In an embodiment, the secondary listing of legitimate URLs may include a redirect page that includes an advertising space that can be bid for by legitimate entities (or competing peer brands) listed in the secondary listing of legitimate URLs.

The browse application may generate one or more analytics based on the recorded information relating to a user device (block 622). As shown in FIG. 6, when the browser application is either allowed access to the received URL or redirected to a legitimate URL, user behavior is tracked/recorded. Based on the recorded user behavior, analytics may be derived, which is discussed in greater detail with respect to FIG. 7.

Figure 7:
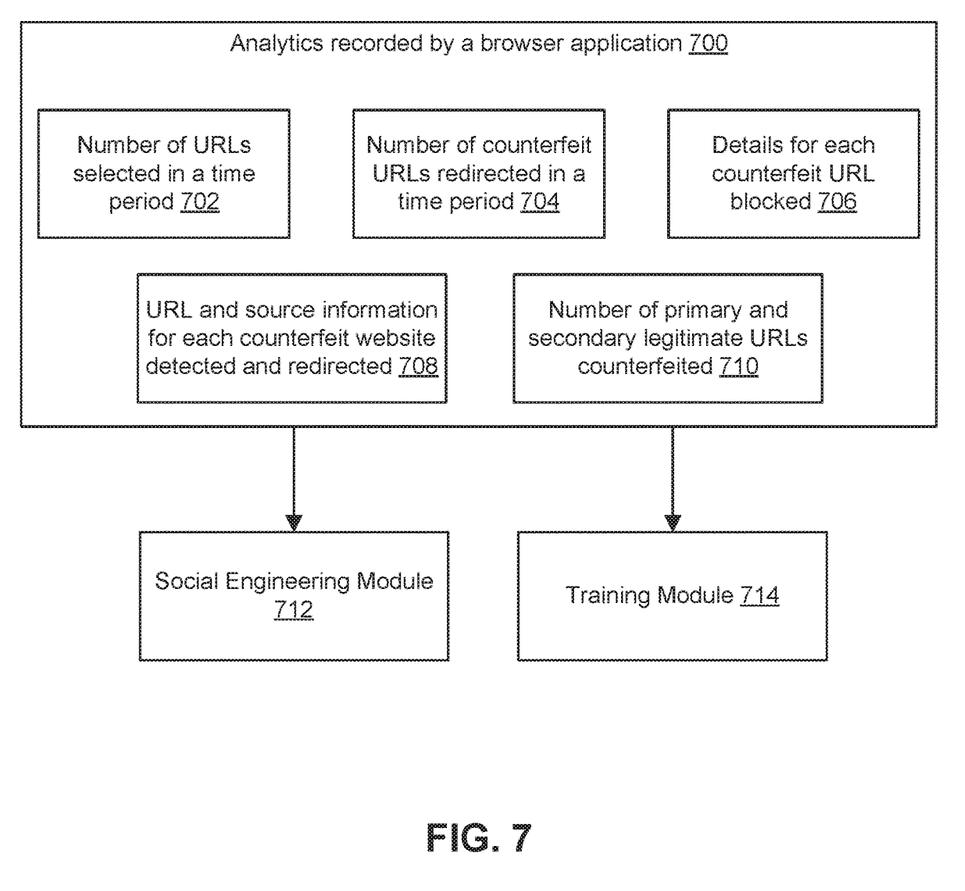
FIG. 7 illustrates a block diagram of analytics that may be generated, according to one embodiment.

FIG. 7 illustrates a block diagram of analytics that may be generated, according to one embodiment. A browser application executing on a user device may record user behavior and interactions between the user device and the browser application. Examples of user behavior and interactions that are tracked may include URL requests received by each user, URL requests that were allowed or blocked, URL requests that were redirected to a known legitimate URLs, URL requests that were redirected to a legitimate URL, etc.

The browse application may generate one or more analytics based on the recorded information relating to a user device. An analytic may include a number of URLs selected in a time period (block 702). The number of URLs selected in a time period may include a number of requests to access a specified URL on a web browser executing on a browser application. This may represent the number of overall requests for a URL during a time period (e.g., a day, month, year).

An analytic may include a number of counterfeited URLs redirected in a time period (block 704). The number of counterfeited URLs redirected in a time period may include a number of instances that a requested URL was determined to be counterfeit and the browser application was redirected to a legitimate URL. In some embodiments, the requested URL may be determined to be counterfeit by one of matching a received URL with a known counterfeit URL and receiving an assessment that the received URL is counterfeit from a CDS.

An analytic may include details for each counterfeited URLs redirected (block 706). This may include the received URLs deemed to be counterfeit and information relating to these URLs (e.g., the type of URL, the type of content included in the webpage of each URL, why the URL was deemed counterfeit). The details of each counterfeit URL may provide insight as to common mistakes the user is making in requesting a URL.

An analytic may include URL and source information for each counterfeit website detected and redirected (block 708). Examples of URL and source information may include a website type, content included in the websites and URLs, HTTP information in the websites, etc.

An analytic may include a number of legitimate URLs that were counterfeited that were included in either of a primary listing of legitimate URLs and a secondary listing of legitimate URLs (block 710). As noted above, a primary listing of legitimate URLs may include a list of legitimate entities that are subscribed to receive a redirected URL from a browser application of a user device. A secondary listing of legitimate URLs may include a second listing of legitimate entities that offered a bid to have a redirected URL redirect to their legitimate URL. In some embodiments, the requested URL may be redirected to a legitimate URL on the secondary listing of legitimate URLs when no URL listed on the primary listing of legitimate URLs matches the content of the received URL with a specific or threshold similarity.

In some embodiments, the analytics generated for the user device can be included in a set of analytics for a client. In this case, the analytics can include trends and metrics for a plurality of users interacting with counterfeit URLs that were redirected to legitimate URLs.

Based on the analytics derived from the user behavior and interactions with a user device, a social engineering module 712 may be initiated for a user device. A social engineering module 712 may include a series of instructions and materials to assist a user interacting with a user device to detect and avoid a counterfeit URL and request access to legitimate URLs. The social engineering module 712 may be displayed on an extension of the browser extension. In some embodiments, the social engineering module 712 includes a series of best practices that are superimposed over a webpage displayed on the web browser, where the user interacting with the web browser can interact with the best practices included in the social engineering module. In some embodiments, the progress through the social engineering module 712 may be recorded.

In some embodiments, the social engineering training module 712 may be specific to a user device. For example, the social engineering training process may include a set of best practices to avoid a specific type of counterfeit URLs based on analytic(s) indicating that the user has repeatedly requested a counterfeit URL of that specific type. The social engineering training process may include multiple sets of best practices or instructions based on various analytics and trends associated with a user.

In some embodiments, the social engineering training module 712 may be initiated based on a triggering event identified in the analytics. If an analytic exceeds a threshold, a corresponding set of instructions for the social engineering training process may be displayed on the browser. As an example, if a user has requested a number of URLs that have been redirected to a legitimate URL that exceeds a threshold number, the browser application of a user may be extended to include a social engineering training process that includes a set of instructions for identifying counterfeit URLs.

In some embodiments, it may be determined from recorded interactions with a user device that a number of instances that the browser extension executing on the user device was redirected from a received URL to a legitimate URL exceeds a threshold number. Based on the number exceeding the threshold number, the browser extension may be extended to display a social engineering module providing instructions to identify legitimate URLs and avoid counterfeit URLs.

Based on the analytics derived from the user behavior and interactions with a user device, a training module 714 may be initiated on a browser application of a user device. A training module 714 may include a series of instructions or activities to train the user to identify legitimate URLs and avoid counterfeit URLs. In some embodiments, the training module may include a series of activities and media (e.g., videos, images) providing examples and interactive instructions on avoiding counterfeit URLs. A browser extension on a user device may extend to include the training module 714. In some embodiments, the training module may track the progress of the user through the series of activities associated with the training module. The training module may administer training on phishing prevention best practices to users who click on such phishing links, and track training progress.

In some embodiments, the training module 714 may be specific to a user device. For example, the training module may include multiple sets of activities to be completed based on the analytics derived from the user behavior. For example, a first set of activities in the training module can relate to avoiding counterfeit URLs and a second set of activities in the training module can relate to best practices for provide legitimate URL requests.

In some embodiments, the training module 714 may be initiated based on a triggering event identified in the analytics. If an analytic exceeds a threshold, a corresponding training module may be displayed on the browser. As an example, if a user has requested a number of counterfeit URLs that exceeds a threshold number, the browser application of a user may be extended to include a training module that includes a set of activities for avoiding counterfeit URLs.

Example Computing Device

Figure 8:
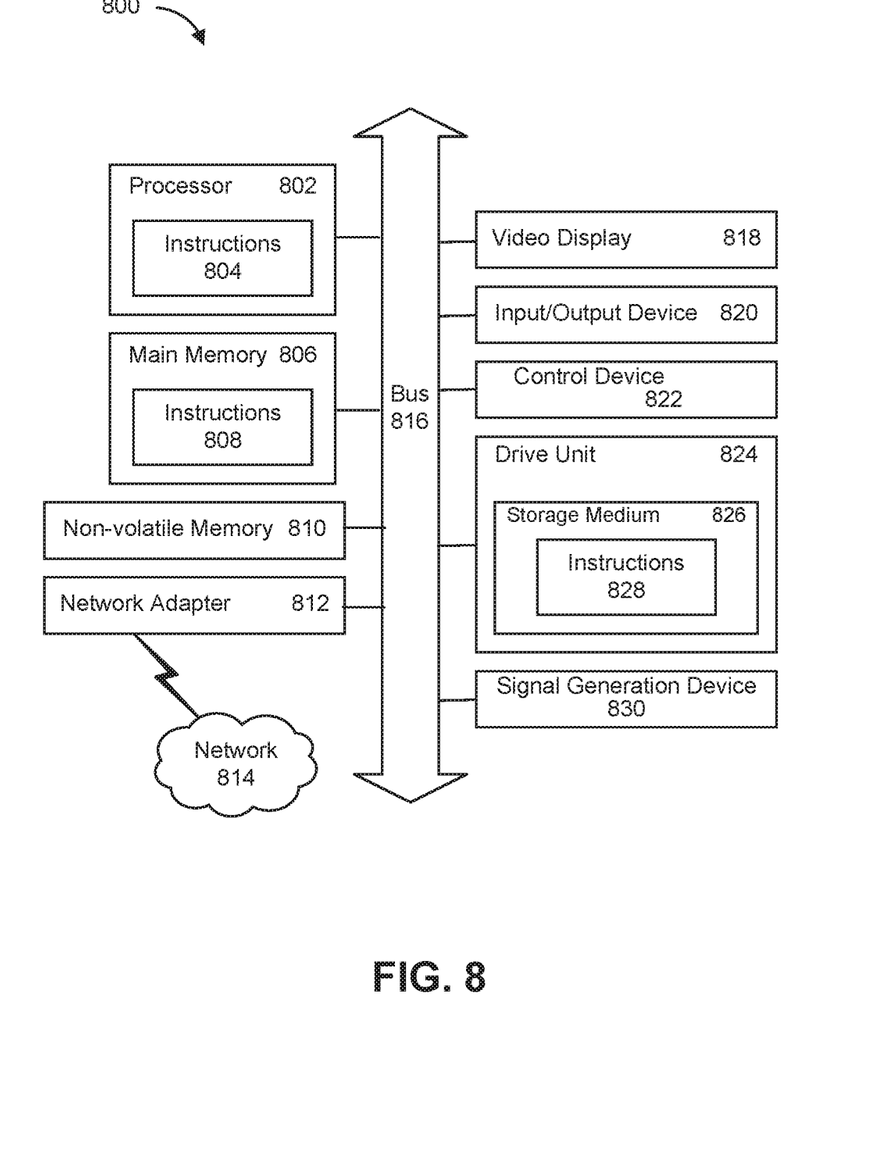
FIG. 8 is a block diagram illustrating an example of a processing system in which at least some operations described herein can be implemented.

FIG. 8 is a block diagram illustrating an example of a processing system 800 in which at least some operations described herein can be implemented. For example, one or more of the user device 110 or counterfeit URL detection system 130 may be implemented as the example processing system 800. The processing system 800 may include one or more central processing units ("processors") 802, main memory 806, non-volatile memory 810, network adapter 812 (e.g., network interfaces), video display 818, input/output devices 820, control device 822 (e.g., keyboard and pointing devices), drive unit 824 including a storage medium 826, and signal generation device 630 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, also called "Firewire."

In various embodiments, the processing system 800 operates as part of a user device, although the processing system 800 may also be connected (e.g., wired or wirelessly) to the user device. In a networked deployment, the processing system 800 may operate in the capacity of a server or a client machine in a client-server network environment, or as a peer machine in a peer-to-peer (or distributed) network environment.

The processing system 800 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 812 enables the processing system 800 to mediate data in a network 814 with an entity that is external to the processing system 800 through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:
receiving, at a browser extension operating in a browser application, a uniform resource locator (URL) requested within the browser application;
obtaining information indicating that the received URL is a counterfeit URL;
comparing content extracted from a website associated with the received URL with content associated with websites associated with each of a plurality of legitimate URLs based on obtaining information indicating that the received URL is counterfeit;
identifying a first legitimate URL included in the plurality of legitimate URLs whose associated website includes content that exceeds a threshold similarity to the content of the website associated with the received URL; and
redirecting the browser application to the first legitimate URL based on identifying the first legitimate URL with content exceeding the threshold similarity to the content of the website associated with the received URL;
wherein identifying the first legitimate URL includes:
determining that all websites associated with legitimate URLs included in a portion of the plurality of legitimate URLs listed in a primary listing of legitimate URLs do not exceed the threshold similarity to the extracted content of the website associated with the received URL; and
comparing content extracted from the website associated with the received URL with content associated with websites of a portion of the plurality of legitimate URLs listed in a secondary listing of legitimate URLs representing legitimate entities that include a bid to have the browser application redirected to their legitimate URLs, wherein the first legitimate URL is included in the secondary listing of legitimate URLs.

2. The method of claim 1, further comprising:
transmitting the extracted content from the website associated with the received URL to a counterfeit URL detection system configured to analyze the extracted content, wherein said obtaining information includes receiving an assessment from the counterfeit URL detection system indicating that the received URL is counterfeit.

3. The method of claim 1, further comprising:
comparing the received URL with a listing of known counterfeit URLs, wherein said obtaining information includes matching the received URL with any counterfeit URL listed in the listing of known counterfeit URLs, indicating that the received URL is counterfeit.

4. The method of claim 1, further comprising:
responsive to obtaining information indicating that the received URL is counterfeit, blocking the browser application from accessing content associated with the received URL.

5. The method of claim 1, wherein the primary listing of legitimate URLs represents legitimate entities that are subscribed to receive redirected URL requests.

6. The method of claim 1, further comprising:
identifying a first set of characteristics of the content extracted from the website associated with the received URL, the first set of characteristics including at least one of detected objects, detected text, and detected source information included in the content extracted from the website associated with the received URL; and
identifying a plurality of characteristics of the website associated with the first legitimate URL,
wherein said comparing includes:
comparing the first set of characteristics with the plurality of characteristics to determine a number of common characteristics between the first set of characteristics and the plurality of characteristics; and
determining that the number of common characteristics between the first set of characteristics and the plurality of characteristics exceeds a threshold number of common characteristics representing that the website associated with first legitimate URL is within the threshold similarity to the website associated with the received URL.

7. The method of claim 1, further comprising:
identifying a primary characteristic of the extracted content of the website associated with the received URL;
identifying each legitimate URL included in the secondary listing of legitimate URLs whose associated website includes characteristics matching the primary characteristic,
wherein said redirecting the browser application to the first legitimate URL is based on determining that the bid associated with the first legitimate URL is greater than any bids of the other legitimate URLs included in the secondary listing of legitimate URLs whose associated websites include characteristics matching the primary characteristic.

8. The method of claim 1, further comprising:
recording, by the browser extension, user interactions; and
generating analytics that quantify the user interactions.

9. The method of claim 8, wherein the analytics include at least one of: a number of URL requests received, a number of instances that the browser application was redirected from any received URL to a legitimate URL, a number of instances in which the browser application was redirected to any legitimate URL listed on the primary listing of legitimate URLs, and a number of instances in which the browser application was redirected to any legitimate URL listed on the secondary listing of legitimate URLs.

10. The method of claim 1, wherein the browser extension operating in the browser application is configured to execute on a smartphone.

11. A non-transitory computer-readable storage medium storing a browser extension that comprises computer program instructions, the computer program instructions when executed by a processor causing the processor to:
receive a uniform resource locator (URL);
obtain information indicating that the received URL is a counterfeit URL;
extract content from a webpage associated with the received URL and from webpages associated with each of a plurality of legitimate URLs associated with legitimate entities;
compare the extracted content from the webpage associated with the received URL and the extracted content from the webpages associated with each of the plurality of legitimate URLs to identify a first legitimate URL included in the plurality of legitimate URLs whose associated webpage has a similarity to the content of the webpage associated with the received URL that exceeds a threshold similarity, wherein identifying the first legitimate URL includes:
  determining that no legitimate URL, included in a listing of known legitimate URLs that have subscribed to receive browser application redirects, has an associated webpage having a similarity to the extracted content of the webpage associated with the received URL that exceeds the threshold similarity; and
  inspecting extracted content from webpages associated with legitimate URLs included in a secondary listing of legitimate URLs that are associated with a bid to receive redirected URL requests, wherein the first legitimate URL is included in the secondary listing of legitimate URLs and includes a greater bid value than any other legitimate URL listed on the secondary listing of legitimate URLs that are associated with webpages having a similarity to the content of the webpage associated with the received URL that exceeds the threshold similarity; and
  redirect a browser application to the first legitimate URL based on identifying the first legitimate URL.

12. The non-transitory computer-readable storage medium of claim 11, wherein the computer program instructions, when executed by the processor, further cause the processor to:
  compare the received URL with a listing of known counterfeit URLs; and
  transmit the extracted content of the webpage associated with the received URL to a counterfeit URL detection system configured to analyze the extracted content based on failing to match the received URL with any known counterfeit URL listed on the listing of known counterfeit URLs, wherein said obtaining information includes receiving an assessment from the counterfeit URL detection system indicating that the received URL is counterfeit.

13. The non-transitory computer-readable storage medium of claim 11, wherein the computer program instructions, when executed by the processor, further cause the processor to:
  record, by the browser extension, user behaviors and interactions with the received URL and the first legitimate URL;
  generate analytics that quantify the user behaviors and interactions with the received URL and the first legitimate URL; and
  display the analytics on a webpage.

14. A method comprising:
  receiving a request to access a webpage associated with a requested uniform resource locator (URL) at a browser extension operating in a browser application on a user device;
  applying a first model to content extracted from the webpage, the first model trained to output an assessment indicating that the requested URL is counterfeit;
  making a similarity determination to determine that content extracted from a webpage associated with a legitimate URL has a similarity to content extracted from the webpage associated with the requested URL that exceeds a threshold similarity;
  redirecting the browser application from the requested URL to the legitimate URL based on the exceeded threshold similarity;
  recording interactions between the user device and the requested URL and the legitimate URL; and
  generating one or more analytics based on the recorded interactions;
  wherein the similarity determination includes:
    determining that all webpages associated with a primary listing of legitimate URLs do not exceed the threshold similarity to the extracted content of the webpage associated with the requested URL; and
    comparing content extracted from the webpage associated with the requested URL with content associated with webpages listed in a secondary listing of legitimate URLs representing legitimate entities that include a bid to have the browser application redirect to their legitimate URLs, wherein the legitimate URL is included in the secondary listing of legitimate URLs.

15. The method of claim 14, wherein the analytics include at least one of: a number of URL requests received, a number of instances that the browser application was redirected from any requested URL to a legitimate URL, a number of instances in which the browser application was redirected to any legitimate URL listed on the primary listing of legitimate URLs, and a number of instances in which the browser application was redirected to any legitimate URL listed on the secondary listing of legitimate URLs.

16. The method of claim 14, wherein the extracted content of any of the webpage associated with the requested URL and the webpage associated with the legitimate URL comprises at least one of: an object detected in an image extracted from the webpage, text extracted from the webpage, a hypertext transfer protocol (HTTP) request header or body, and an HTTP response header or body.

17. The method of claim 14, further comprising:
  determining, from the recorded interactions, that a number of instances in which the browser extension application was redirected from a requested URL to a legitimate URL exceeds a threshold number; and
  displaying a social engineering module on the user device, the social engineering module providing instructions to identify legitimate URLs and avoid counterfeit URLs.

18. The method of claim 14, further comprising:
  determining, from the recorded interactions, that a number of instances in which the browser application was redirected from a requested URL to a legitimate URL exceeds a threshold number; and
  implementing a training module on the user device, the training module providing a series of instructions to train a user to identify legitimate URLs and avoid counterfeit URLs, wherein the training module tracks a progression of the user through the series of instructions.

19. The method of claim 14, further comprising the first model comparing the requested URL with a listing of known counterfeit URLs and matching the requested URL with a known counterfeit URL to determine that the requested URL is counterfeit.

20. The method of claim 14, wherein the primary listing of legitimate URLs represents legitimate entities that are subscribed to receive redirected URL requests.

* * * * *